Patented June 14, 1938

2,120,547

UNITED STATES PATENT OFFICE 2,120,547

VULCANIZATION OF RUBBER

Albert M. Clifford, Stow, Ohio, assignor to Wingfoot Corporation, Wilmington, Del., a corporation of Delaware No Drawing. Application October 16, 1935,
Serial No. 45,233

16 Claims. (Cl. 18—53)

This invention relates to a class of new chemical compositions suitable as accelerators of the vulcanization of rubber and to the method of preparing them. More particularly, it relates to the aldehyde derivatives of secondary aliphatic diamines of the type R—NH—X—NH—R$_1$, in which R, R$_1$ and X are straight chain or cyclic aliphatic hydrocarbon groups.

It has previously been reported that the dialkyl alkylene diamines are excellent accelerators of the vulcanization of rubber. The present invention involves the discovery that by reacting aldehydes with the diamines of the type referred to above, novel compositions having excellent vulcanization accelerator action are formed.

The diamines employed in the practice of the invention may be prepared as described in United States Patent 1,948,317.

One specific compound which falls within the present invention is the reaction product of symmetrical dibutyl ethylene diamine and acetaldol. It is prepared as follows: 51.6 parts by weight of dibutyl ethylene diamine and 27 parts by weight of acetaldol are heated together under reflux to the boiling point and treated with 0.2 part of concentrated hydrochloric acid. The refluxing is continued for an hour, whereupon the resulting oily product is washed repeatedly with water and dried by heating under reduced pressure.

Similarly, 51.6 parts by weight of sym-dibutyl ethylene diamine and 24 parts by weight of n-butyraldehyde are refluxed for one hour. The water which separates is removed and the residue heated to 100° C. under reduced pressure until it is completely dry and free from low boiling materials. The resulting product is a pale yellow oily liquid.

A mixture of 51.6 parts by weight of sym-dibutyl ethylene diamine and 38 parts by weight of alpha ethyl beta propyl acrolein by the same method likewise gives a yellow oil.

These and the other products of the invention are all very high boiling, thick, sirupy, pale straw to dark brown oils with a characteristic amine-like odor. The yields are just about quantitative, practically all of the starting mass except for the water of condensation being obtainable in the final products.

Zinc chloride or other condensing agents may be employed instead of hydrochloric acid or the reaction may be conducted in the absence of any condensing agent.

The exact nature of the reaction product obtained is not known, but it is believed that reactions of at least two types may take place.

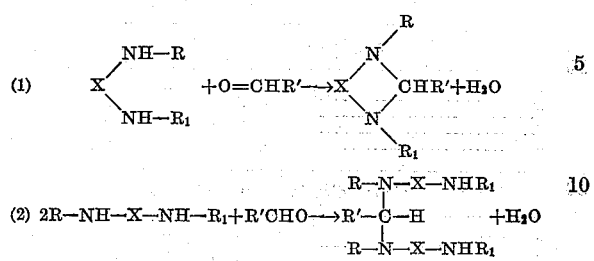

Other reactions, including condensation of the aldehyde to give an aldol or an unsaturated aldehyde with subsequent condensation with the amine, may take place.

It therefore becomes obvious, with the possible ramifications of the reaction, that the proportions of aldehyde and amine used may be varied between very wide limits. Generally speaking, however, if the ratio of aldehyde to amine is made greater than about 15:1, there is such a diluent effect with consequent loss of accelerating power that the compounds lose their value.

It is to be understood that the invention is not limited to the use of dibutyl ethylene diamine. Dimethyl-, diethyl-, di-propyl-, diamyl-, diheptyl- and dialicyclic substituted ethylene diamines may be employed. Also, the diamine may be substituted by mixed radicals, so that there are different types at each end. Also, the ethylene group may be replaced by a propylene, butylene, amylene, cyclohexylene, or analogous aliphatic group.

Representative of these compounds are sym-dibutyl 1-3 or 1-2 propylene diamine, sym-dicyclohexyl ethylene diamine, sym-di(o- or p-methyl cyclohexyl) ethylene diamine, sym-dibutyl methylene diamine, sym-dibutyl butylene diamine, ethyl butyl ethylene diamine, sym-dibutyl cyclohexylene diamine, butyl cyclohexyl propylene diamine, sym-di(o- or p-ethoxy cyclohexyl) ethylene diamine, and methyl propyl ethylene diamine.

Also, various aldehydes may be substituted for those of the examples. These include benzaldehyde, furfural, hydroxy naphthylaldehyde, acetaldehyde, crotonaldehyde, alpha methyl beta propyl acrolein, heptaldehyde, chloro butyraldehyde and various branched chain unsaturated aldehydes derived by means of an aldol condensation.

The materials of the invention may be employed as accelerators of vulcanization in most of the ordinary rubber compounds. However, the following is a specific example of a formula in which they have been found by trial to yield excellent results:

| | Parts by weight |
|---|---|
| Rubber (extracted pale crepe) | 100 |
| Zinc oxide | 5 |
| Sulphur | 3 |
| Stearic acid | 1.5 |
| Accelerator | 0.5 |

In order to test the efficiency of the compounds of the invention, representative materials were incorporated in samples of rubber prepared in accordance with the preceding formula. The samples were subjected to vulcanization for various lengths of time and tested. The results of the tests are as follows:

| Time in mins. | Ult. tens. kgs./cm.² | Modulus in kgs/cm.² | | Ult. elong. in percent |
|---|---|---|---|---|
| | | 500% | 700% | |
| *Dibutyl ethylene diamine—aldol condensate* | | | | |
| 20/260° F | 60 | 7 | 16 | 950 |
| 40 | 117 | 14 | 43 | 875 |
| 60 | 149 | 24 | 93 | 780 |
| 60/285 | 200 | 42 | 183 | 720 |
| *Dibutyl ethylene diamine—butyraldehyde condensate* | | | | |
| 20/260° F | 60 | 7 | 16 | 960 |
| 40 | 122 | 15 | 52 | 840 |
| 60 | 148 | 24 | 99 | 775 |
| *Dibutyl ethylene diamine—alpha ethyl beta propyl acrolein condensate* | | | | |
| 40/260° F | 64 | 10 | 28 | 850 |
| 60 | 98 | 12 | 37 | 860 |
| 80 | 126 | 23 | 82 | 775 |
| 60/285 | 196 | 37 | 158 | 735 |

From these data it is apparent that the compounds of the invention are excellent vulcanization accelerators, producing adequate cures within comparatively short periods of time. Rubber compounds identical with those above described, but containing no accelerator, are either unvulcanized or only partially vulcanized under such conditions.

Although only the preferred form of the invention has been described in detail, it will be apparent to those skilled in the art that the invention is not limited thereto but that various modifications may be made therein without departing from the spirit of the invention or the scope of the appended claims. It is intended that the patent shall cover, by suitable expression in the appended claims, all features of patentable novelty inherent in the invention.

What I claim is:

1. A method of treating rubber which comprises subjecting it to vulcanization in the presence of an aldehyde derivative of a material having the formula

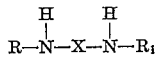

in which R, X and R₁ are selected from the group consisting of straight chain and cyclic aliphatic hydrocarbon groups.

2. A method of treating rubber which comprises subjecting it to vulcanization in the presence of an aldehyde derivative of an alkylene diamine symmetrically disubstituted by butyl groups.

3. A method of treating rubber which comprises subjecting it to vulcanization in the presence of an aldehyde derivative of an ethylene diamine symmetrically disubstituted by aliphatic hydrocarbon groups.

4. A method of treating rubber which comprises subjecting it to vulcanization in the presence of an aldehyde derivative of symmetrical dibutyl ethylene diamine.

5. A rubber product that has been vulcanized in the presence of an aldehyde derivative of a material having the formula

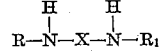

in which R, X and R₁ are selected from the group consisting of straight chain and cyclic aliphatic hydrocarbon groups.

6. A rubber product that has been vulcanized in the presence of an aldehyde derivative of an alkylene diamine symmetrically disubstituted by butyl groups.

7. A rubber product that has been vulcanized in the presence of an aldehyde derivative of an ethylene diamine symmetrically disubstituted by aliphatic hydrocarbon groups.

8. A rubber product that has been vulcanized in the presence of an aldehyde derivative of symmetrical dibutyl ethylene diamine.

9. An aldehyde derivative of a symmetrical dialkyl alkylene diamine.

10. A method of treating rubber which comprises subjecting it to vulcanization in the presence of the reaction product of an aliphatic aldehyde and a material having the formula

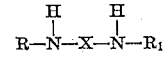

in which R, X and R₁ are selected from the group consisting of straight chain and cyclic aliphatic hydrocarbon groups.

11. A method of treating rubber which comprises subjecting it to vulcanization in the presence of the reaction product of acetaldol and symmetrical dibutyl ethylene diamine.

12. A method of treating rubber which comprises subjecting it to vulcanization in the presence of the reaction product of alpha ethyl beta propyl acrolein and symmetrical dibutyl ethylene diamine.

13. A method of treating rubber which comprises subjecting it to vulcanization in the presence of the reaction product of butyraldehyde and symmetrical dibutyl ethylene diamine.

14. The reaction product of an aliphatic aldehyde and a material having the formula $$R-\underset{H}{N}-X-\underset{H}{N}-R_1$$

in which R, X and R₁ are selected from the group consisting of straight chain and cyclic aliphatic hydrocarbon groups.

15. The reaction product of acetaldol and symmetrical dibutyl ethylene diamine.

16. The reaction product of an aliphatic aldehyde and a symmetrical dialkyl alkylene diamine.

ALBERT M. CLIFFORD.